(12) United States Patent
Huang et al.

(10) Patent No.: US 7,798,677 B2
(45) Date of Patent: Sep. 21, 2010

(54) ILLUMINATION UNIT FOR PROJECTION SYSTEMS

(75) Inventors: Ho-Chi Huang, Tainan County (TW); Baolong Zhang, Tainan County (TW)

(73) Assignee: Himax Display, Inc., Tainan County (TW)

( * ) Notice: Subject to any disclaimer, the term of this patent is extended or adjusted under 35 U.S.C. 154(b) by 328 days.

(21) Appl. No.: 12/111,631

(22) Filed: Apr. 29, 2008

(65) Prior Publication Data
US 2009/0268469 A1 Oct. 29, 2009

(51) Int. Cl.
*F21V 5/04* (2006.01)
(52) U.S. Cl. ............. 362/309; 362/311.02; 362/311.06; 362/311.09; 362/311.12; 362/347; 362/296.04; 362/296.05
(58) Field of Classification Search ................. 362/309, 362/310, 311.02, 311.06, 311.09, 311.12, 362/347, 327, 332, 334, 336, 340, 296.04, 362/296, 5, 299, 300; 313/512
See application file for complete search history.

(56) References Cited

U.S. PATENT DOCUMENTS 2,215,900 A * 9/1940 Bitner ......................... 362/309
7,207,700 B2 * 4/2007 Fallahi et al. ............... 362/334

FOREIGN PATENT DOCUMENTS

| CN | 1731011 | 2/2006 |
| CN | 101018975 | 8/2007 |
| JP | 2005-347224 | 12/2005 |

* cited by examiner

*Primary Examiner*—Sharon E Payne
(74) *Attorney, Agent, or Firm*—J.C. Patents

(57) ABSTRACT

An illumination unit for emitting light along an optic axis for a projection system includes an LED die and a collimator lens. The collimator lens includes a central part and a peripheral part. The central part has a first light transmission surface and a second light transmission surface opposite to the first light transmission surface. The peripheral part which is around the central part has an inner refraction wall coupled to the first light transmission surface to form a hollow for situating the LED die, an outer reflection wall opposite to the inner refraction wall, and a refraction surface connecting to the second light transmission surface and the outer reflection wall. Both the central part and the peripheral part of the collimator lens are rotationally asymmetrical corresponding to the optic axis.

20 Claims, 9 Drawing Sheets

ILLUMINATION UNIT FOR PROJECTION SYSTEMS

BACKGROUND OF THE INVENTION

1. Field of the Invention

The present invention relates to the illumination unit and more particularly to the illumination unit for projection systems.

2. Description of Related Art

The projector system requires a light source to illuminate the imager for projection. The light emitting diode (LED) is a preferable choice because of its small physical size, low-power consumption, long lifetime and availability of three primary colors. The LED has been widely used in many areas of general lighting, and driven by these applications to make it better and better in optical efficiency and color saturation.

The LED is typically packaged with an LED die or dies on a metal support for heat dissipation. The electrical connections are made from the LED die or dies to the bonding pads, which are on top of the metal support by a layer of isolation. Most of the LED die or dies are further surrounded and protected by a plastic encapsulation. The typical plastic encapsulation is a flat layer or a hemisphere dome of epoxy. This plastic encapsulation can extract more light from the LED die or dies, and is referred as the primary optics of the LED. The LED in the flat encapsulation emits the light in a well-known Lambertian distribution, and the LED in the hemisphere encapsulation emits the light in a more collimated Gaussian distribution.

FIG. 1 shows a conventional LED 10, which includes a support 11, a LED die or array of dies 12, bonding pads 13 and a plastic encapsulation 14. The support 11 is shown as a flat metal support, on which the LED die or dies 12 are adhered to. The bonding pads 13 were on top of the metal support with a layer of isolation 15, and the electric connections 16 are made form the LED die or dies 12 to the bonding pads 13. A plastic encapsulation 14 in a form of flat layer, hemisphere or any other curvature surrounds the LED die or dies 12 for the protection. This plastic encapsulation 14 is also served as the primary optics to extract more light from the LED die or dies 12 with different angular distributions.

FIG. 2 shows a diagram of the projection system with the LED. In detail, it shows a typical reflective-type projector system 20 with an LED 21 as the illuminant. The LED 21 can be the same as the LED 10 shown in FIG. 1. A secondary optics 22 is placed in front of the LED 21 to converge the light from a wider angular distribution to a more directional angular distribution. The light will then pass through an optional pre-polarizer 23 to a polarizing beam splitter (PBS) 24, which reflects the polarized light to a reflective imager 25. The typical reflective imager is for example a liquid-crystal-on-silicon (LCOS) microdisplay. This reflective imager 25 modulates and reflects the light back to the PBS 24, and then through an optional post-polarizer 26 to a projection lens 27 for the projection.

FIG. 3 shows a conventional secondary optics 30 of the LED used in the projection systems. The LED 31 can be the same as the LED 10 shown in FIG. 1. The secondary optics 30 is a set of lenses, which can be spherical, aspherical, or diffractive lenses. This set of lens elements is commonly referred as the condenser lens. The LED 31 is placed in the focal point of the condenser lens. The light emission from the LED and falls into this condenser lens can be collected by this condenser lens and be converged in a more directional and collimated way for illumination of the imager in the projector system. Only the light, which enters the condenser lens, can be collected by the condenser lens. Therefore, the diameter of the condenser lens has to be large and the focal length has to be shorter for the condenser lens to collect more light from the LED emission. As a result, the condenser lens by the spherical or aspherical construction is large and bulky. It is also difficult to collect all the light from the LED 41, and hence, the coupling efficiency of the LED to the imager is low. Replacing the spherical or aspherical lens by a diffractive lens can reduce the thickness of the condenser lens, but the coupling efficiency is still low and further suffered by the scattering loss on the diffractive surface of the diffractive lens.

FIG. 4 shows another secondary optics 40 of the LED 41 for light illumination. The LED 41 can be the same as the LED 10 shown in FIG. 1. The secondary optics 40 is a compound parabolic collimator (CPC) and is placed above the LED 41. The light emission from the LED 41 enters the flat bottom surface 42 of the CPC and will be reflected at the parabolic wall 43 by total internal reflection (TIR), and then exits from the flat top surface 44. This secondary optics 40 can collect the light emission which is from the LED 41 and enters the bottom surface 42, and pass the light out through the top surface 44 in a specific angular distribution according to the parabolic wall 43. This kind of secondary optics is a long and symmetrical cylinder, and passes the light into a symmetric cone for particular light illumination.

FIG. 5 shows another secondary optics 50 of the LED 51 for general lighting. The LED 51 can be the same as the LED 10 shown in FIG. 1. The secondary optics 50 is placed on top of the LED 51 and covers the LED 51. The secondary optics with an inner refractive lens 53, an inner refractive wall 54, an outer reflective wall 55 and a flat top surface 56, is placed on top of the LED 51 and covers the LED 51. This secondary optics 50 can collect all the light emission from the LED 51, and pass the light out in a specific angular distribution according to the surfaces of 53, 54, 55 and 56. The surfaces 55 and 56 are typical straight or flat. A subsequent patent (U.S. Pat. No. 6,547,423) proposed to change these two surfaces to more generally cured surfaces for an improved performance and reduced size. This kind of secondary optics is a shallow and symmetric disk, and passes the light into a symmetric cone for general lighting.

In summary, the primary optics of the LED is to extract more light from the LED die or dies to increase the external efficiency of the LED, while the secondary optics will be more application dependent. For the projector system, the secondary optics of the LED is to improve the directionality of the light emission from the LED to the imager of the projector system, or to increase the coupling efficiency of the LED to the imager of the projector system with all the light extracted from the primary optics of the LED. However, the light emission from the LED is not collimated or directional enough for the projector system. In addition, the light emission from the LED is in a rotational symmetric cone, which does not match the aspect ratio of the imager of the projector system such as 4:3 or 16:9. For the necessity, a new structure of the illumination unit is preferred for the projector systems.

SUMMARY OF THE INVENTION

Accordingly, the present invention provides an illumination unit for projection systems which is particularly useful and efficient for projection systems.

The present invention provides a collimator lens for illumination unit to converge the wide-angle light emission from the illumination unit into a more directional and specific angular distribution to match the projection optics of the projector systems.

According to an exemplary embodiment of the present invention, an illumination unit for emitting light along an optic axis for a projection system including an LED die and a collimator lens is provided. The collimator lens includes a central part and a peripheral part. The central part has a first light transmission surface and a second light transmission surface opposite to the first light transmission surface. The peripheral part which is around the central part has an inner refraction wall coupled to the first light transmission surface to form a hollow for situating the LED die, an outer reflection wall opposite to the inner refraction wall, and a refraction surface connecting to the second light transmission surface and the outer reflection wall. Both the central part and the peripheral part of the collimator lens are rotationally asymmetrical corresponding to the optic axis.

According to another exemplary embodiment of the present invention, a collimator lens for an illuminant to emit light along an optic axis for a projection system including a central part and a peripheral part is provided. The central part has a first light transmission surface and a second light transmission surface opposite to the first light transmission surface. The peripheral part which is around the central part has an inner refraction wall coupled to the first light transmission surface to form a hollow for situating the illuminant, an outer refraction wall opposite to the inner refraction wall and a reflection surface connecting to the second light transmission surface and the outer refraction wall. Both the central part and the peripheral part of the collimator lens are rotationally asymmetrical corresponding to the optic axis.

According to another exemplary embodiment of the present invention, a projector system including a housing which accommodates one or a plurality of illumination units as described in foregoing embodiment is provided. The collimator lens of the secondary optics which incorporates several surfaces to surround the LED in a close proximity to collect all the light emission from the LED, and further converge the wide-angle light emission from the LED into a more directional and specific angular distribution to match the projection optics of the projector system. The compact LED illumination unit with the secondary optics and the LED is particularly useful and efficient for small projector systems using small imagers such as LCOS or other microdisplays.

According to another exemplary embodiment of the present invention, a collimator lens of secondary optics for an illumination unit to emit light along an optic axis for a projector is provided. The illumination angular distribution can be an elliptic shape by the oval design of the secondary optics, to match better the aspect ratio of the imager of the projector. The resulting illumination unit with both the secondary optics and the LED is compact because of the close proximity of the secondary optics to the LED. The optical efficiency of the projector system would be high because of the close matching of the illumination cone with the aspect ratio of the rectangular imager.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
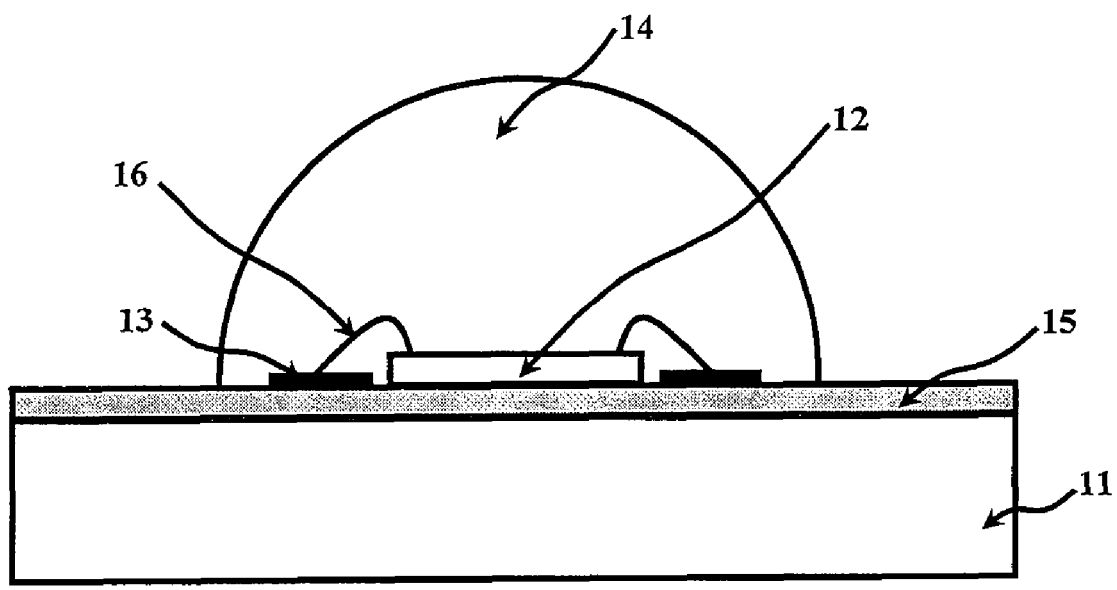
FIG. 1 is a conventional LED.
Figure 2:
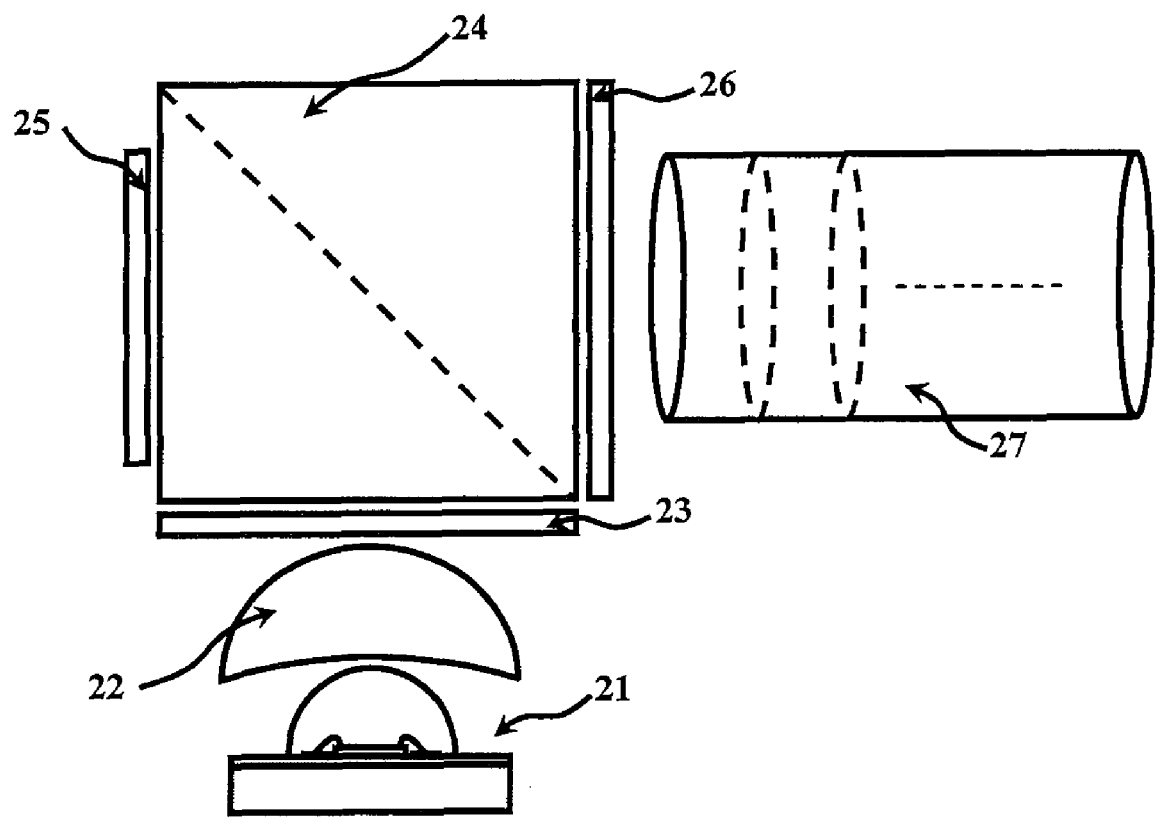
FIG. 2 is a diagram of the projection system with the LED.
Figure 3:
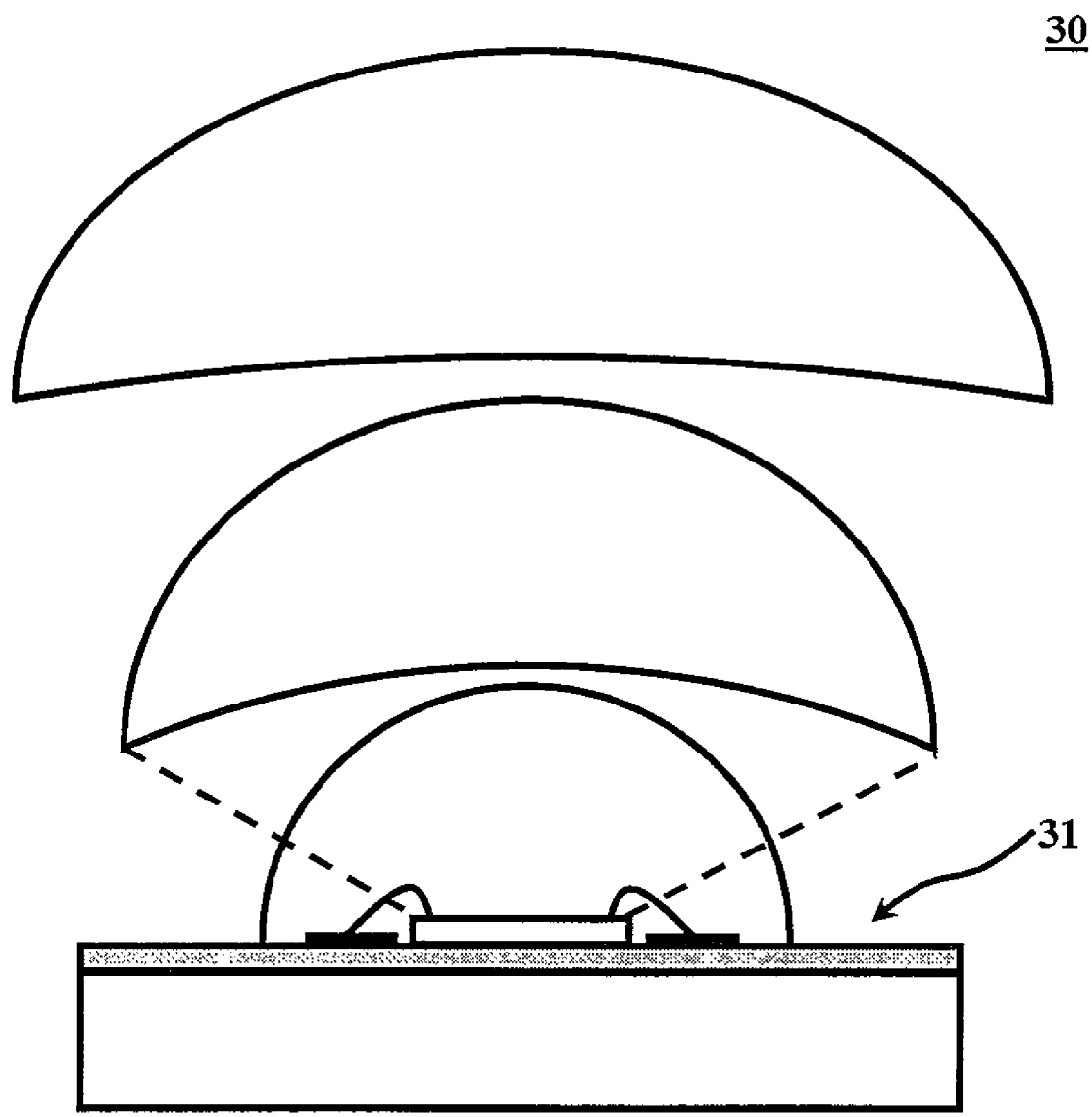
FIG. 3 is a diagram of a conventional secondary optics of the LED.
Figure 4:
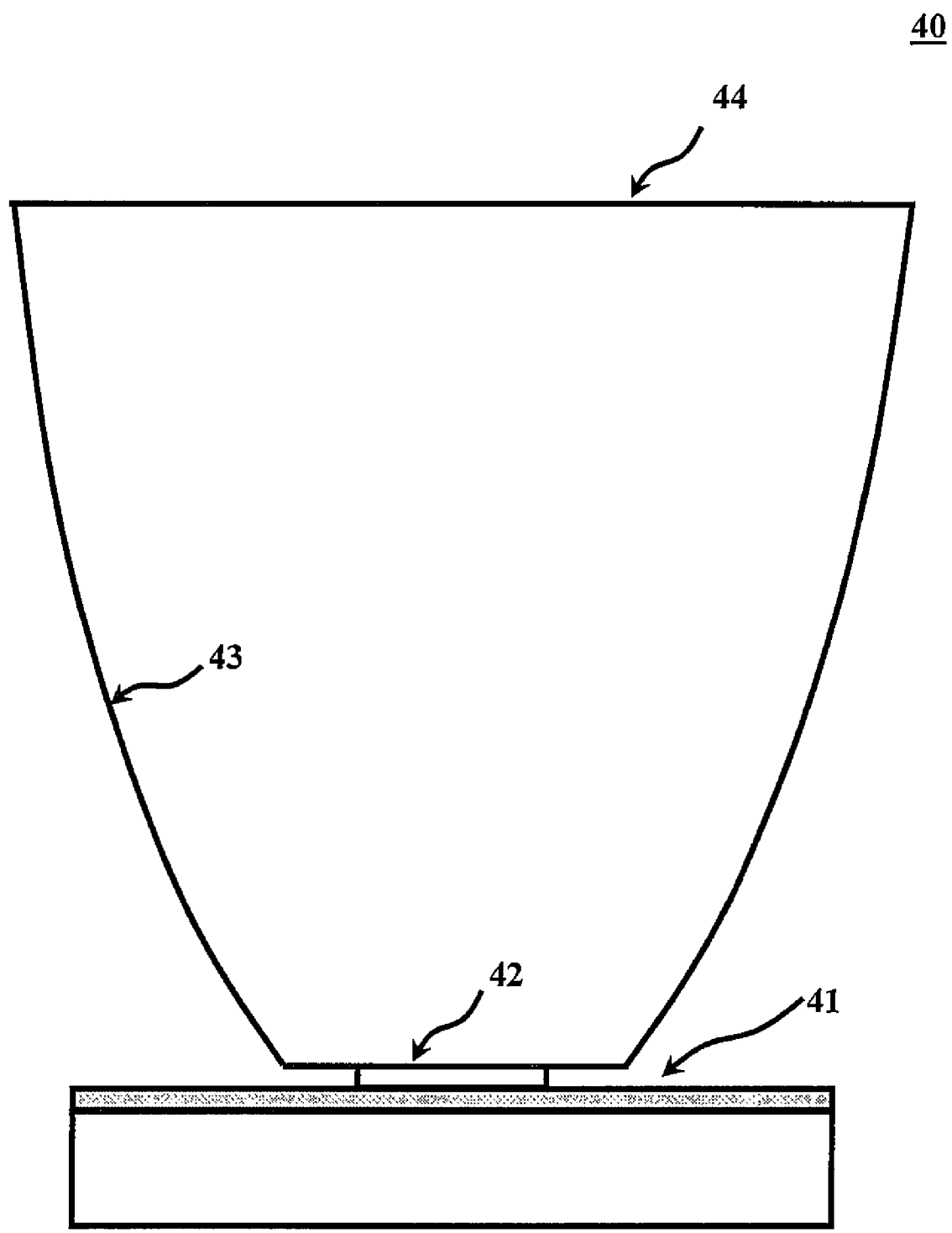
FIG. 4 is a diagram of another secondary optics of the LED.
Figure 5:
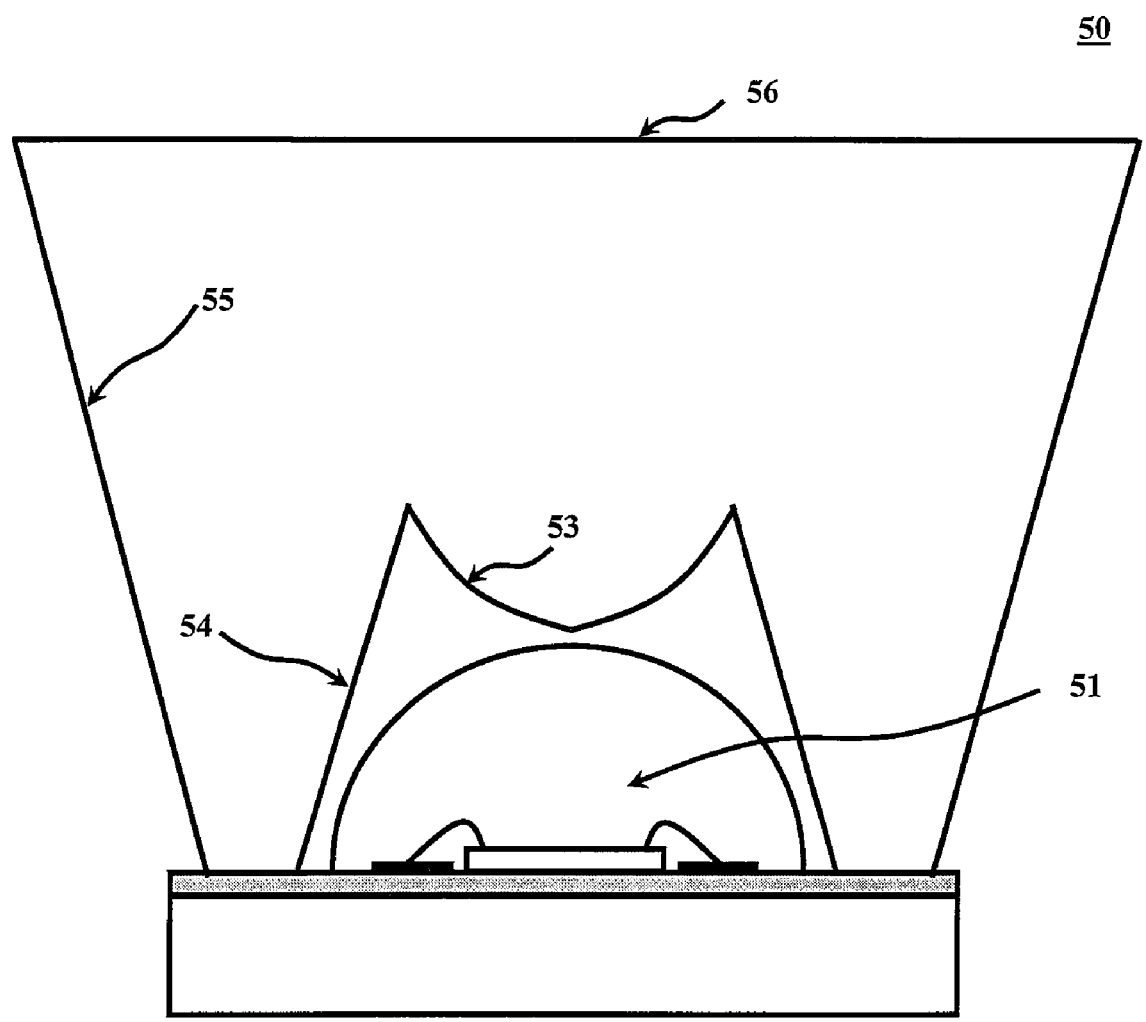
FIG. 5 is a diagram of another secondary optics of the LED.

Reference will now be made in detail to the present preferred embodiments of the invention, examples of which are illustrated in the accompanying drawings. Wherever possible, the same reference numbers are used in the drawings and the description to refer to the same or like parts.

It should be noted that in the following description of the embodiments, the illuminant of the illumination unit is exemplary the light emitting diode (LED). It is noted that although the LED is adopted to implement the illumination unit, any person skilled in the art can utilize other substituted elements to put the embodiment of the present invention into practice, and not in limitation.

Figure 6:
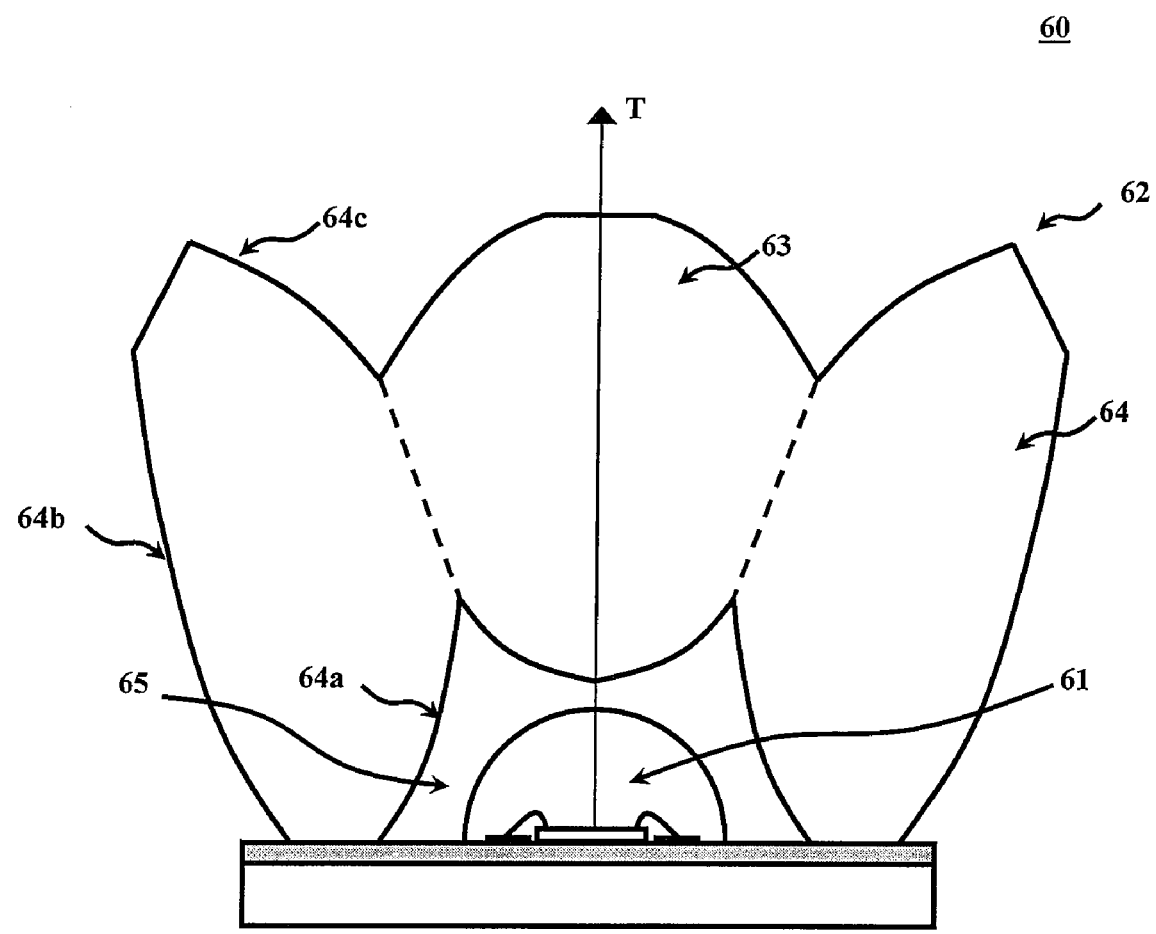
FIG. 6 is a schematic cross-section view of a secondary optics of the LED according to an exemplary embodiment of the present invention.

FIG. 6 shows a schematic cross-section view of a secondary optics according to an exemplary embodiment of the present invention. The illumination unit 60 comprises an LED 61 and a secondary optics. The LED 61 can be the same as the LED 10 shown in FIG. 1. The collimator lens 62 is referred as the secondary optics of the LED. Referring to FIG. 6, the collimator lens 62 comprises a central part 63 and a peripheral part 64. A hollow 65 is formed by these two parts for situating the LED 61. An optic axis T corresponds to the light emission path of the collimator lens 62. In the present embodiment, the central part 63 of the collimator lens 62 is basically a condenser lens, which collects the light emission from the LED 61 within a certain angle with respect to the optic axis T for passing the light into a small cone. The peripheral part 64 of the collimator lens 62 has three curvatures, which construct a set of lens elements. The first curvature 64a collects all the light falling into this part and transmits the light to the second curvature 64b, which is a reflect surface. This second curvature 64b reflects the light to the third curvature 64c, which passes the light into the small cone out of the peripheral part. The light emission angle out of the peripheral part would be the same or close to that of the central part.

Figure 7:
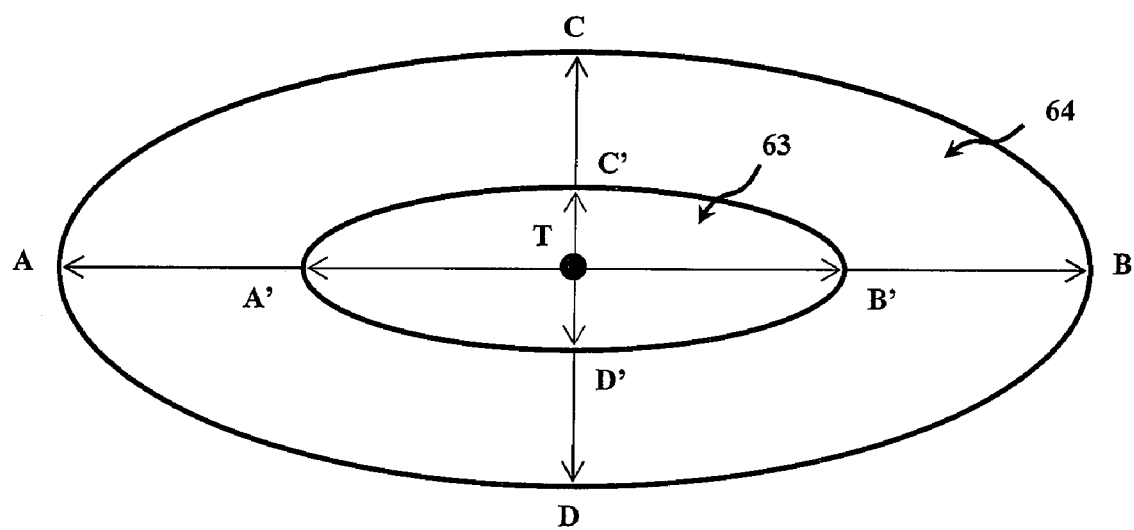
FIG. 7 is a schematic top view of the secondary optics of the LED according to the exemplary embodiment in FIG. 6.

FIG. 7 is a schematic top view of the secondary optics according to the exemplary embodiment in FIG. 6 of the present invention. In the present embodiment, both the central part 63 and the peripheral part 64 of the collimator lens 62 are not necessarily cylindrically symmetric. As a matter of fact, an oval design of the collimator lens 62 is preferred. Referring to FIG. 6 and FIG. 7, the node T represents the optic axis corresponding to the collimator lens 62. The node T of the optic axis is defined as a vector which is perpendicular to the surface and points from the inside of the element to the outside of the element through the surface. The central part 63 and the peripheral part 64 are respectively oval-shaped. The line segment AB, which passes through the node T, is a major axis of the oval-shaped peripheral part 64, and the line segment CD, which passes through the node T, represents a minor axis of the oval-shaped peripheral part 64. Similarly, the line segment A'B' and line segment C'D' respectively represent a major axis and a minor axis of the oval-shaped central part 63. An aspect ratio of the oval shape is defined by the ratio of the minor axis to the major axis. In the present embodiment, the typical aspect ratio of this oval optics is 95%, but can be in the range of 91 to 99% by different applications. With this oval shape of the collimator lens 62 of the secondary optics, the light emission pattern would not be a circular, but an elliptical shape that matches better the 4:3 or 16:9 aspect ratio of the imager in the projector system.

Figure 8:
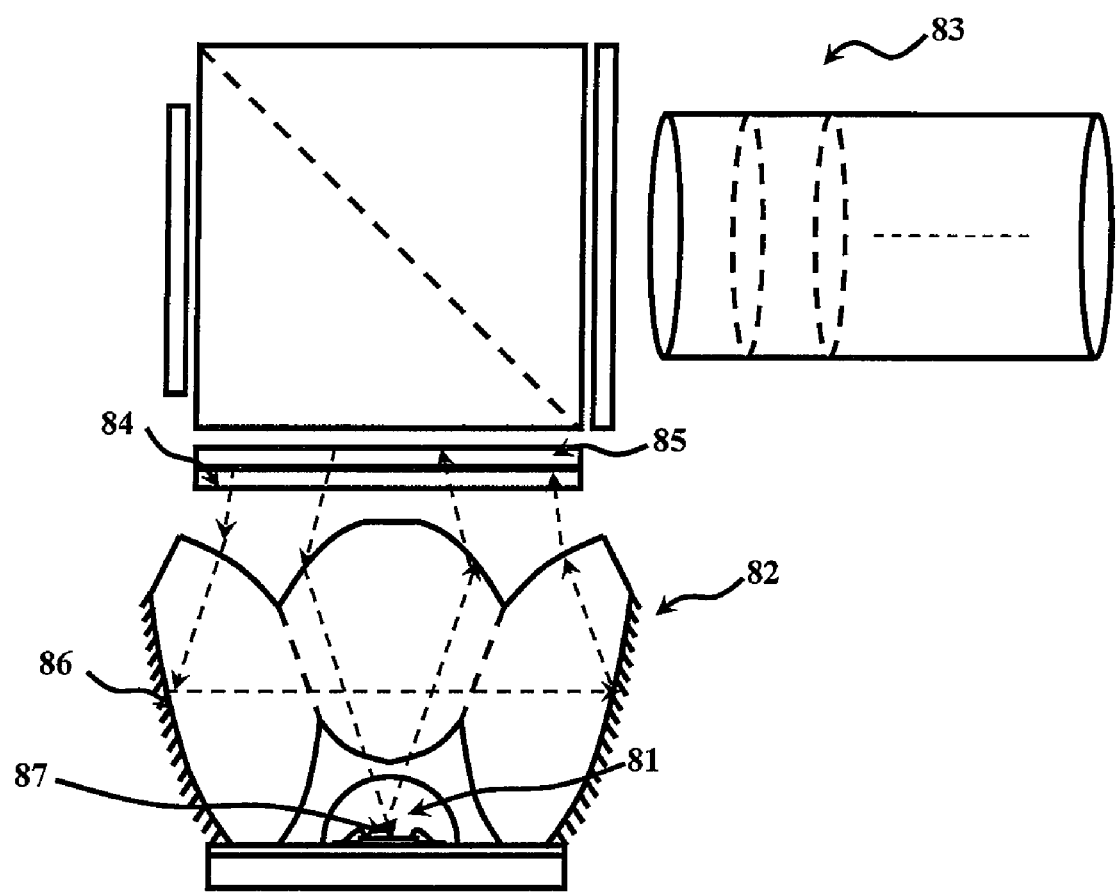
FIG. 8 is a diagram of a projector system with the secondary optics of the LED according to another exemplary embodiment of the present invention.

FIG. 8 shows a diagram of a projector system with the secondary optics according to another exemplary embodiment of the present invention. The collimator lens 82 surrounds the LED 81 to converge all the light emission from the LED 81 to a more directional angular distribution. An optional quarter-wave plate 84 and a reflective polarizer 85 can be placed in front of the secondary optics to pass only the p-polarization of light to the imager, and reflects the other s-polarization of light back to the collimator lens. Parts of the reflected light into the peripheral part of the collimator lens will be reflected by the reflected curvature 86 to the other side of the reflected curvature, and be reflected again to pass out of the collimator lens. Parts of the reflected light into the central part of the collimator lens will be reflected by the emitting surface 87 of the LED die or dies, and back to the central part and out of the collimator lens. These reflected light beams will go through the quarter-wave plate 84 again and transfer from the s-polarization to the p-polarization, and pass the reflective polarizer 85. The light will then pass to a polarizing beam splitter (PBS) 86, which reflects the polarized light to a reflective imager 87. The typical reflective imager is for example a liquid-crystal-on-silicon (LCOS) microdisplay. This reflective imager 87 modulates and reflects the light back to the PBS 86, and then through an optional post-polarizer 88 to a projection lens 83 for the projection. A simple polarization conversion scheme can be implemented by this collimator lens.

Figure 9:
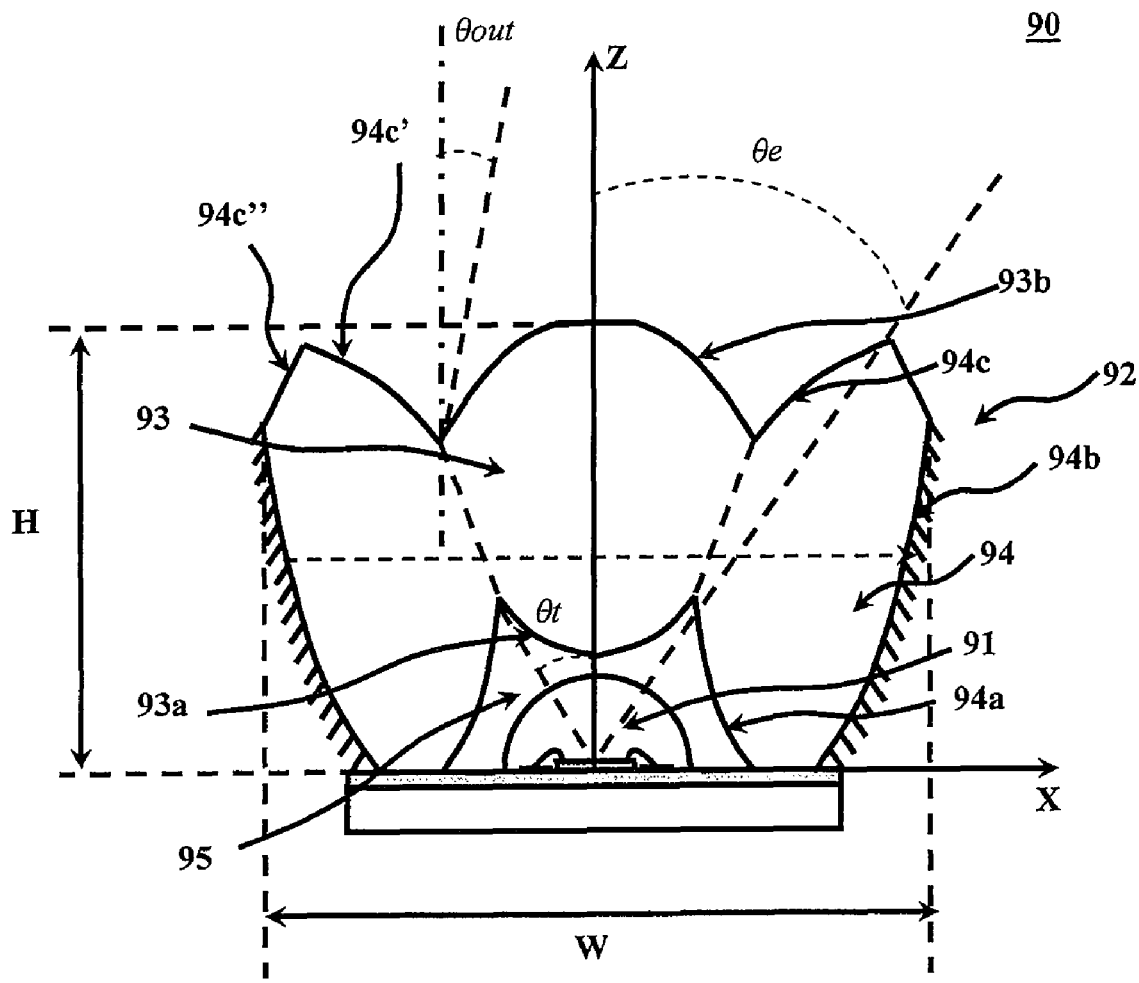
FIG. 9 is a detailed drawing of the schematic cross-section view of the secondary optics of the LED according to the exemplary embodiment in FIG. 6.

FIG. 9 shows a detailed drawing of the schematic cross-section view of the secondary optics of the LED according to the exemplary embodiment in FIG. 6. of the present invention. FIG. 9 is the same as FIG. 7, but with more parameters for better description of this illumination unit 90. The LED 91 comprises an emitting surface of an LED die or array of dies, or a thin phosphor layer coated on and excited by such an LED die or array of dies. In the present embodiment, the emitting surface corresponds to x-y plane of a Cartesian xyz coordinate system in FIG. 9. The optic axis T extends along the axis Z of the Cartesian xyz coordinate system. The LED 91 is usually packaged with an optically transmissive encapsulant such as a plastic encapsulation over the emitting surface of the LED die or dies for the protection of the LED die or dies. It depends on the shape of this plastic encapsulation, which is often referred as the primary optics of the LED 91, the light emission distribution from the LED 91 can be very different. The light emission from such a packaged LED can be from Lambertian to Gaussian distributions over a full hemisphere of solid angle, corresponding to an emission angle θe with respect to the optic axis that ranges from 0 to 90 degrees as shown in FIG. 9.

The collimator lens 92 as the secondary optics is one piece of plastic element and can be made by low-cost plastic molding. The collimator lens 92 comprises a central part 93 and a peripheral part 94. The central part 93 has a first light transmission surface 93*a* and a second light transmission surface 93*b* opposite to the first light transmission surface 93*a*. The peripheral part 94 around the central part 93 has an inner refraction wall 94*a* coupled to the first light transmission surface 93*a* to form a hollow 95 for situating the LED 91, an outer reflection wall 94*b* opposite to the inner refraction wall 94*a*, and a refraction surface 94*c* connecting to the second light transmission surface 93*b* and the outer reflection wall 94*b*. In the present embodiment, both the central part 93 and the peripheral part 94 of the collimator lens 92 are rotationally asymmetrical corresponding to the optic axis T. A top view of the central part 93 is a first oval shape and a top view of the peripheral part 94 is a second oval shape as described in FIG. 8. The aspect ratio of the first oval shape is between 91% and 99% and the aspect ratio of the second oval shape is between 91% and 99%.

Referring to FIG. 9, the first light transmission surface 93*a* and the second light transmission surface 93*b* of the central part 93 form a condenser lens to converge the light from a wider angular distribution into a more directional and a smaller angular distribution of an output angle θout. The typical output angle θout of the central part 93 is 15 degrees corresponding to typical projection optics. However, this output angle θout can also be from 10 to 20 degrees, to match the f-number of the projection optics. There is a threshold angle θt, to divide the collimator lens 92 into the central part 93 and peripheral part 94, and this typical threshold angle is 55 degrees, but can be in a range of 40 to 70 degrees. The first light transmission surface 93*a* and the second light transmission surface 93*b* can be spherical or aspherical, but the aspherical surfaces are preferred since only two surfaces would be used for the design of this central condenser lens. These two aspherical lens surfaces are designed by point-point curve fitting with a ray-tracing optical tool. The first light transmission surface 93*a* can be placed very close to the LED 91 to minimize the height H of the collimator lens 92. The typical height H of the collimator lens 92 is from 5 to 15 mm in the present embodiment, and makes the illumination unit 90 very compact.

The peripheral part 94 of the collimator lens 92 has three surfaces, inner refraction wall 94*a*, outer reflection wall 94*b* and refraction surface 94*c*, respectively. These three surfaces can again form a condenser lens to converge the light from a wider angular distribution into a more directional and a smaller angular distribution of an output angle θout. The typical output angle θout of the peripheral part 94 is 15 degrees corresponding to typical projection optics. However, this output angle θout can also be from 10 to 20 degrees, to match the f-number of the projection optics. This output angle θout of the peripheral part can be the same or slightly different from the output angle θout of the central part. The surfaces 94*a*, 94*b* and 94*c* can be spherical or aspherical, but the aspherical surfaces are preferred since only three surfaces would be used for this peripheral condenser lens. In the present embodiment, the inner refraction wall 94*a* and the refraction surface 94*c* are transmissive, while the outer reflection wall 94*b* is reflective, which can be form by reflected mirror, total internal reflection, or reflective dielectric coating for example. As shown in the FIG. 9, the refraction surface 94*c* of the peripheral part 94 can further comprises a first curved surface 94*c*' connecting to the second light transmission surface 93*b* and a flat surface 93*c*" connecting to the outer reflection wall 94*b*. The first curved surface 94*c*' collects the light falling into this part and passes the light in a specific angular distribution of an output angle θout in the range of 10 to 20 degrees. The flat surface 93*c*" collects the light falling into this part and converge the light into a more directional and a smaller angular distribution. People ordinary skilled in the art have well known that the refraction surface 94c can be form with any different structure by different applications. The typical width W of the collimator lens 92 is from 10 to 25 mm in the present embodiment, and makes the illumination unit 90 very compact.

In summary, the above embodiments disclose the collimator lens of the secondary optics for illumination unit. The light passed through the secondary optics can be in any specific angular distribution by different designs of the surfaces on the secondary optics. The illumination angular distribution can be an elliptic shape by the oval design of the secondary optics, to match better the aspect ratio of the imager of the projectors. The optical efficiency of the projector system would be high because of the close matching of the illumination cone with the aspect ratio of the rectangular imager. The compact LED illumination unit with the secondary optics and the common LED is particularly useful and efficient for small projector systems using small imagers like LCOS or other microdisplays.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. An illumination unit for emitting light along an optic axis for a projection system comprising: an LED die; and a collimator lens comprising: a central part having a first light transmission surface and a second light transmission surface opposite to the first light transmission surface; and a peripheral part around the central part having an inner refraction wall coupled to the first light transmission surface to form a hollow for situating the LED die, an outer reflection wall opposite to the inner refraction wall, and a refraction surface connecting to the second light transmission surface and the outer reflection wall, wherein both the central part and the peripheral part of the collimator lens are rotationally asymmetrical corresponding to the optic axis; the peripheral part having a refraction surface the section of which has a curved top surface that connects to the central part on one side and to a flat surface at an acute, downward facing angle on the opposite side, the flat surface connecting to the outer reflection wall.

2. The illumination unit as claimed in claim 1, wherein a front view of the central part is a first oval shape and a front view of the peripheral part is a second oval shape.

3. The illumination unit as claimed in claim 2, wherein the aspect ratio of the first oval shape is between 91% and 99% and the aspect ratio of the second oval shape is between 91% and 99%.

4. The illumination unit as claimed in claim 1, wherein the collimator lens is one piece of plastic element.

5. The illumination unit as claimed in claim 1, further comprising an optically transmissive encapsulant covering the LED die.

6. The illumination unit as claimed in claim 1, wherein the refraction surface of the peripheral part further comprising a first curved surface connecting to the second light transmission surface and a flat surface connecting to the outer reflection wall.

7. The illumination unit as claimed in claim 1, wherein the first light transmission surface and the second light transmission surface of the central part of the collimator lens are spherical or aspherical.

8. The illumination unit as claimed in claim 1, wherein the outer reflection wall of the peripheral part of the collimator lens is formed with a reflected mirror, a total internal reflection, or a dielectric coating.

9. The illumination unit as claimed in claim 1, wherein the central part of the collimator lens is a condenser lens.

10. The illumination unit as claimed in claim 1, wherein the central part of the collimator lens passes light into a small cone between 10 and 20 degrees.

11. The illumination unit as claimed in claim 1, wherein the peripheral part of the collimator lens passes light into a small cone between 10 and 20 degrees.

12. The illumination unit as claimed in claim 1, wherein the height of the collimator lens is between 5 to 15 mm.

13. The illumination unit as claimed in claim 1, wherein the width of the collimator lens is between 10 to 25 mm.

14. A projector system comprising a housing which accommodates one or a plurality of illumination units as defined in claim 1.

15. A collimator lens for an illuminant to emit light along an optic axis for a projection system comprising: a central part having a first light transmission surface and a second light transmission surface opposite to the first light transmission surface; a peripheral part around the central part having an inner refraction wall coupled to the first light transmission surface to form a hollow for situating the illuminant; an outer refraction wall opposite to the inner refraction wall; and a reflection surface connecting to the second light transmission surface and the outer refraction wall wherein both the central part and the peripheral part of the collimator tens are rotationally asymmetrical corresponding to the optic axis; the peripheral part having a refraction surface the section of which has a curved top surface that connects to the central part on one side and to a flat surface at an acute, downward facing angle on the opposite side, the flat surface connecting to the outer reflection wall.

16. The collimator lens as claimed in claim 15, wherein a front view of the central part is a first oval shape and a front view of the peripheral part is a second oval shape.

17. The collimator lens as claimed in claim 16, wherein the aspect ratio of the first oval shape is between 91% and 99% and the aspect ratio of the second oval shape is between 91% and 99%.

18. The collimator lens as claimed in claim 15, wherein the collimator lens is one piece of plastic element.

19. The collimator lens as claimed in claim 15, wherein the refraction surface further comprising a first curved surface connecting to the second light transmission surface and a flat surface connecting to the outer reflection wall.

20. The collimator lens as claimed in claim 15, wherein the outer reflection wall of the peripheral part of the collimator lens is formed with a reflected mirror, a total internal reflection, or a dielectric coating.

* * * * *